(12) United States Patent
Leask et al.

(10) Patent No.: US 7,269,562 B2
(45) Date of Patent: Sep. 11, 2007

(54) WEB SERVICE CALL FLOW SPEECH COMPONENTS

(75) Inventors: Gary M. Leask, Dallas, TX (US); Karthik Ranganathan, Plano, TX (US); Thomas Stark, Allen, TX (US)

(73) Assignee: Intervoice Limited Partnership, Dallas, TX (US)

( * ) Notice: Subject to any disclaimer, the term of this patent is extended or adjusted under 35 U.S.C. 154(b) by 895 days.

(21) Appl. No.: 10/426,007

(22) Filed: Apr. 29, 2003

(65) Prior Publication Data

US 2004/0220810 A1    Nov. 4, 2004

(51) Int. Cl.
*G10L 15/00* (2006.01)
(52) U.S. Cl. ..................... 704/275; 379/88.03
(58) Field of Classification Search ............ 704/275; 379/88.03
See application file for complete search history.

(56) References Cited

U.S. PATENT DOCUMENTS

| | | | |
|---|---|---|---|
| 6,314,402 B1* | 11/2001 | Monaco et al. ............. | 704/275 |
| 2002/0156900 A1 | 10/2002 | Marquette et al. | |
| 2003/0055884 A1 | 3/2003 | Yuen et al. | |
| 2003/0083882 A1* | 5/2003 | Schemers, III et al. .. | 704/270.1 |
| 2004/0141595 A1* | 7/2004 | Crockett et al. ......... | 379/88.17 |
| 2004/0247094 A1* | 12/2004 | Crockett et al. ......... | 379/88.17 |
| 2005/0234727 A1* | 10/2005 | Chiu ....................... | 704/270.1 |

FOREIGN PATENT DOCUMENTS

WO    WO 01/50453    7/2001

OTHER PUBLICATIONS

"15 Seconds: Creating a .NET Web Service," Article by Chris Peiris, dated Apr. 30, 2001 [Retrieved on: May 6, 2003] Retrieved from: www.15seconds.com/issue/010430.htm.
"Speech Interfaces Drive Mobile Responsiveness," IDC Executive Brief, Mar. 2002, Retrieved from: www1.avaya.com/enterprise/whitepapers/speech-interfaces.pdg.
"TelePortal™ Solution for Speech-based Web Services," Lucent Technologies, inc., Copyright © 2000, Retrieved from: www.lucent.com/livelink/146082_FactSheet.pdf.
Marquette, Brian; "Voice-Enabled Applications Deployed Using the Component Server Architecture", Retrieved on-line on May 6, 2003, http://sandcherry.com/products/spec/CompSvrArchVoice.pdf.

(Continued)

*Primary Examiner*—Daniel Abebe
(74) *Attorney, Agent, or Firm*—Fulbright & Jaworski LLP

(57) ABSTRACT

A system and method is disclosed for exposing complete call flow speech components to users via Web services that are called by converged voice-Web server applications. The Web service call flow speech components may be accessed by application server pages resident on a Web server and accessible through either a telephony environment or a data network environment, such as the Internet. The Web service call flow speech objects automatically generate the appropriate speech access formatting into the corresponding server application page. By removing the speech component programming from development of the application server page, the representative embodiments expand the potential use of multimodal and or converged voice-Web applications and devices.

44 Claims, 4 Drawing Sheets

OTHER PUBLICATIONS

Steinberg, Daniel H., "The future Beyond Web Services: A JavaOne Keynote Report", Retrieved on-line on May 6, 2003, http://www.onjava.com/pub/a/onjava/2001/06/06/javanote_keynote.html.

Sullivan, Tom., and Scannell, Ed., "Microsoft, Sun Vie for Web Services," Retrieved on-line on May 6, 2003, http://pcworld.com/news/article/0,aid,67566,00.asp.

Peiris, Chris., "Building Client Interfaces for .NET Web Services", Retrieved on-line on May 6, 2003, http://www.15seconds.com/Issue/010530.htm.

Jurvis, Jeff., "Speak Up: Speech I/O for the Wireless Web", Retrieved on-line on May 6, 2003, http://www.fawcette.com/xmlmag/2002_06/magazine/coloumns/xmlunplugged/.

Udell, Jon., "Speakable Web Service", Retrieved on-line on May 6, 2003, http://www.oreillynet.com/pub/a/network/2002/11/08/udell.html.

Yuan, Michael., and Long, Ju., "Java readies itself for wireless Web services", Retrieved on-line on May 6, 2003, http://www.javaworld.com/javaworld/jw-06-2002/jw-0621-wireless_p.html.

Worthen, Ben., "Web Services Still not ready for prime time". Retrieved on-line on May 6, 2003, http://www.cio.com/archive/090102/prime_content.html.

Muse, Dan., "Microsoft Brings Speech to Web Services", Retrieved on-line on May 6, 2003, http://www.aspnews.com/news/trends/article/0,,4341_1041801,00.html.

Sullivan, Tom., "Microsoft's Web Services Interface", Retrieved on-line on May 6, 2003, http://www.pcworld.com/news/article/0,aid,61103,00.asp.

Peiris, Chris., "Creating a .NET Web Service", Retrieved on-line on May 6, 2003, http://www.15seconds.com/Issue/010430.htm.

Blanco, Jorge., and Preston, Pam., "Enterprise Class IP Solutions Portfolio Update", Retrieved on-line on May 6, 2003, http://www.lucent.com/livelink/14602-FactSheet.pdf.

"XML Web Services Working Group", Retrieved on-line on May 6, 2003, http://web-services.gov/.

"Web Services Description Language (WSDL)", Retrieved on-line on May 6, 2003, http://xml.coverpages.org/wsdl.html.

"iBasis, Speech Works Announce Plans To Provide Global Phone Access For Speech—Driven Web Services And Content", Retrieved on-line on May 6, 2003, http://www.tmcnet.com/enews/120400r.htm.

"SandCherry Simplifies Extending Web Applications With Speech by Offering Web Services Interfaces-Upgraded Software™ 2.4 Platform Empowers Java and XML Developers and Expands Multimodel Capabilities", pp. 1-3. Retrieved on-line on May 6, 2003, http://industry.java.sun.com/javanews/stories/story2/0,1072,50054,00.html.

"SandCherry Simplified Extending Web Application with Speech by Offering Web Services Interfaces" Retrieved on-line on May 6, 2003, http://www.crm2day.com.news/crm/EpuuppuFyFfWDyJldl.php.

* cited by examiner

WEB SERVICE CALL FLOW SPEECH COMPONENTS

TECHNICAL FIELD

The present invention is directed, in general, to Internet technology, and, more specifically, implementing call flow speech components as Web services.

BACKGROUND OF THE INVENTION

Within the last several years, the growth of e-commerce and e-business has greatly increased the number of available channels for customers to contact businesses. Businesses have invested in a variety of e-commerce programs from informational Web sites to transactional sites to Web-based applications. Businesses have also begun to develop dedicated portals for business-to-business (B2B) partners as well as employees. Using these various channels, businesses have increased the exposure of their products and have also increased the modes of interaction with customers, partners, and employees. To keep up with the growing e-commerce model, companies now typically consider and plan for interactions through multiple contact points, such as personal computers (PCs), personal data assistants (PDAs), email pagers, Web- and data-enabled mobile phones, in addition to the traditional call centers.

In traditional call centers, businesses enjoy a certain level of automation through interactive voice response (IVR) systems that would typically operate using voice- and dual tone multiple frequency (DTMF)-recognition to obtain data and that would interact with callers through speech response, either pre-recorded or synthetically generated. IVRs allow for a better user-experience while decreasing staffing costs. With the addition of Web-based access, some of the convenience of speech interactivity has been replaced with the convenience of keyboard entry at a computer. However, now, PDAs, web-enabled mobile phones, two-way text pagers, and other devices capable of multimodal communication, add new access points for which a well-established solution has yet to be developed.

One emerging solution centers on the convergence of telephony with the Web. PDAs, which originally began as purely mobile data devices are now being developed with voice capabilities. Similarly, mobile phones, which originally were limited to pure telephony functionality, are now being developed to interact with the Web and other data networks. Furthermore, as wireless networks evolve to 2.5 G and 3 G systems, the increased data throughput generally supports more robust mobile Web-based applications and services.

MICROSOFT™ CORPORATION has developed Speech Application Language Tags (SALT) to add a powerful speech interface to Web pages, while maintaining and leveraging all the advantages of the Web application model. SALT is one of the many languages derived from standard generalized markup language (SGML), such as hypertext markup language (HTML), extensible HTML (XHTML), wireless markup language (WML), and the like. Another speech interface language is VoiceXML™ (VXML). VXML is an XML application which, when combined with voice recognition technology, enables interactive access to the Web through a telephone or voice-driven browser. The main difference between VXML and SALT is that VXML utilizes client-side execution while SALT utilizes server-side execution.

SALT tags are designed to be used for both voice-only browsers (i.e., browsers accessible over a telephony server) and multimodal browsers, such as a typical Web browser like MICROSOFT INTERNET EXPLORER™. SALT is actually a small set of extensible markup language (XML) elements, with associated attributes and document object model (DOM) object properties, events, and methods, that may be used in conjunction with a source markup document to apply a speech interface to the source page. Because SALT maintains a relatively strict syntax, independent from the nature of the source documents, it can generally be used effectively within most flavors of HTML, WML, or other such SGML-derived markup languages.

MICROSOFT™ CORPORATION'S NET Speech SDK, Beta 2 comprises MICROSOFT™ CORPORATION'S ASP.NET controls, a Speech Add-in for MICROSOFT™ CORPORATION'S INTERNET EXPLORER™, and numerous libraries and sample applications. The development tools for implementing the speech integration with SALT are provided in MICROSOFT™ CORPORATION'S Visual Studio .NET™. In its implementation, the MICROSOFT™ architecture generally includes the integral use and intercommunication between SALT-enabled browsers.

FIG. 1 is a block diagram illustrating converged voice-Web system 10. Converged voice-Web system 10 illustrates the architecture implemented in the MICROSOFT™-offered solution. The core of the system comprises telephony server 100, speech server 101, and web server 102. Web server 102 facilitates Web-access by client 103 through Internet 11, while telephony card 104, which may be a T1 or E1 interface card, facilitates telephone access by clients 110, 111, and 109 through the public switched telephone network (PSTN) 105, private branch exchange (PBX) 111, and mobile switching center (MSC) 107. Client 108 may be a PDA or other dual mode wireless device that may access converged voice-Web system 10 through telephony card 104 or Internet 11. Similarly, client 109 may be a multi mode mobile phone capable of either telephony operation, accessing system 10 through telephony card 104 or Web-capable, accessing system 10 through Internet 11.

In an example where a client accesses system 10 via PSTN 106, client 111 accesses telephone server 100 through telephone card 104. Telephone server 100 operates closely with speech server 101 to facilitate audible caller interaction. Speech server 101 typically includes a voice component driver, such as a SALT driver. Upon accessing telephone server 100, telephone server 100 accesses Web server 102 to obtain application server page 112. Application server page 112 includes SALT tags that identify voice-functionality in the application. Telephone server 100 processes application server page 112. When the embedded SALT tags are encountered, telephone server 100 accesses the SALT driver in speech server 101 to execute the SALT code. Any SALT tags that are received from application server page 112 would be executed on speech server 101 with the call control maintained on telephony server 100. Once the code has finished processing, the results are returned to telephony server 100, which either completes the call or disconnects depending on the application being run.

In a multimodal example, client 103 accesses Web server 102 through Internet 11. Application server page 112 is processed on Web server 102 to return the Web pages for display on client 103. In order to take advantages of the SALT functionality written into application server page 112, client 103 typically needs a browser that includes a SALT driver along with text-to-speech (TTS) resources. In existing implementations of system 10, individual pieces of call flow have been written as separate components, such that a developer may create an entire call flow for performing a specific task by assembling the several different piece components. However, as indicated, client 103 must typically include a browser with SALT capabilities along with TTS resources. Furthermore, because application server page 112 includes speech components, the application developer generally must be familiar with the specific speech interface language being utilized, such as SALT, VXML, or the like.

FIG. 2 is a block diagram illustrating existing proprietary converged voice-Web system 20. In proprietary system 20, application server page 202 may be created with specific voice modules 203-205 embedded within the HTML or similar language representation of a Web page. As client 201 accesses Web server 200, application server page 202 is called and executed. Proprietary system 20 monitors the execution of application server page 202 and when each of voice modules 203-205 are encountered, system 20 generates code, such as SUN MICROSYSTEM's JAVASCRIPT™ or the like, that is executable on Web server 200 to provide the specific speech components. Such proprietary systems are typically programmed specifically to provide any certain, desired features. However, because of the proprietary nature, only compatible systems and software may be used, thus, limiting the accessibility of voice modules 203-205.

A further improvement has been suggested by SANDCHERRY, INC., to make media resources, such as text-to-speech (TTS) resources, automatic speech response (ASR) resources, and the like available, to a central application as component servers using one of the signaling protocols for voice over Internet (VoIP), session initiation protocol (SIP). FIG. 3 is a block diagram illustrating SIP-based local component server system 30. Enterprise local area network (ELAN) 300 is typically in communication with caller 301 through media gateway 302. Caller 301 connects to Web server 305 to access a particular application. Web server 305 interfaces with enterprise content 306 that provides the voice site content, such as VXML, SALT tags, prompts, grammars, and the like. As the application accessed by caller 301 requires media resources, such as service controller 305, TTS server 307, and ASR server 310, ELAN 300 communicates with the necessary media resource through each one's SIP interface 306, 308, and 311. Additionally, because TTS 307 and ASR 310 include live speech transfer, those media resources include real-time protocol interfaces 309 and 312. Web server 305 processes the information from the media resources and from enterprise content 306 and implements the resulting voice pages through VXML browser 303 and it's SIP interface 304. Caller 301 is then able to interact with the desired application with the voice/speech information processed through VXML browser 303. Local component server system 30 is managed and monitored by voice site monitor 313.

The component server system described by SANDCHERRY, INC., has also been suggested in a remote provision orientation. FIG. 4 is a block diagram illustrating SIP-based distributed component server system 40. In distributed component server system 40, the desired application is provisioned through an application service provider (ASP) on ASP local area network (ASP-LAN) 401. ASP-LAN 401 communicates with caller 402 through media gateway 403. As caller 402 wishes to interact with the desired application, the application is accessed through Web server 404 and ASP hosted sites 405. Furthermore, as the application requires media resources, it may access the media resource component servers, such as service controller 408, VXML browser 406, ASR server 410, TTS server 413, or the like, through each resource's SIP interface 407, 409, 411, 414. Additionally, as before, ASR server 410 and TTS server 413 are also serviced by RTP interfaces 412 and 415, respectively.

Although the systems in FIGS. 3 and 4 show implementing the component server system using VXML, SANDCHERRY, INC., has also suggested implementation of this system using other open architecture features such as SALT, SOAP, and Web services.

SUMMARY OF THE INVENTION

Representative embodiments of the present invention are directed to a system and method for exposing complete call flow speech components to users via Web services that are called by converged voice-Web server applications. The Web service call flow speech components may be accessed by application server pages resident on a Web server and accessible through either a telephony environment or a data network environment, such as the Internet. The Web service call flow speech objects automatically generate the appropriate speech access formatting into the corresponding server application page. By removing the speech component programming from development of the application server page, the representative embodiments expand the potential use of multimodal and or converged voice-Web applications and devices.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
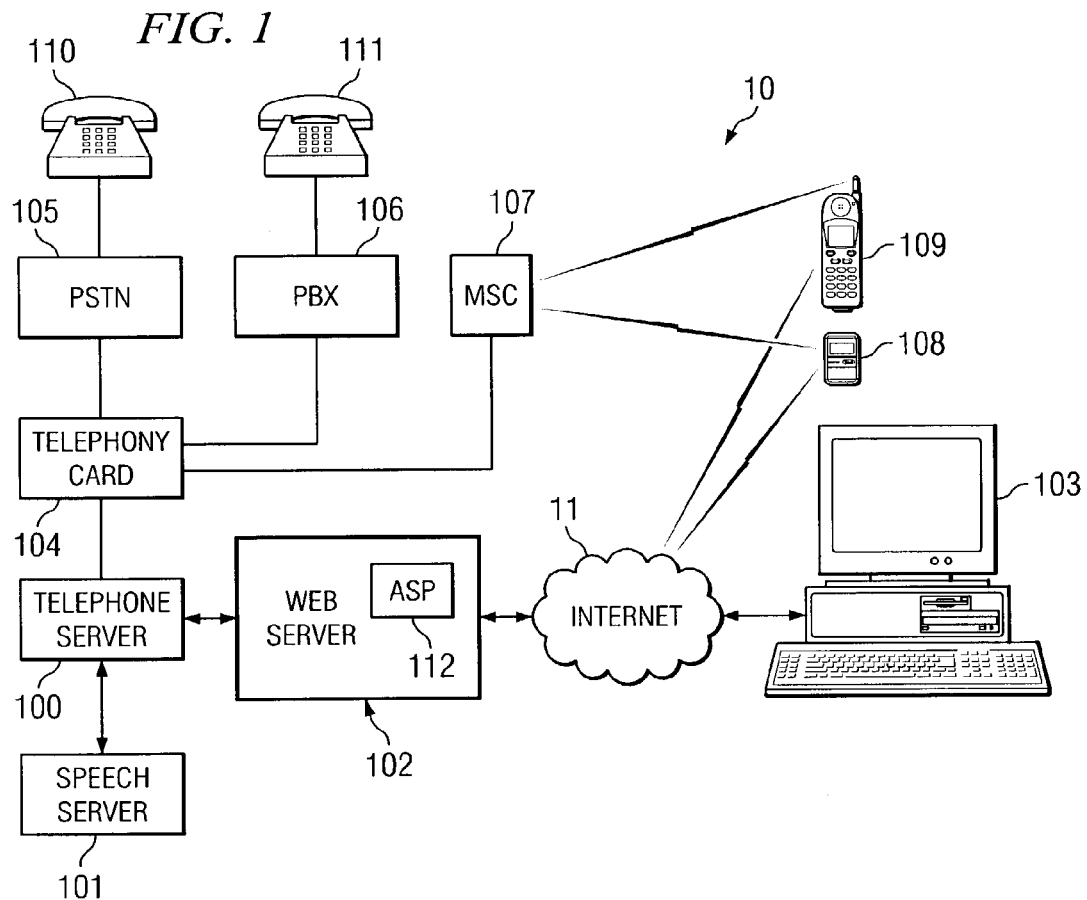
FIG. 1 is a block diagram illustrating an existing converged voice-Web system.
Figure 2:
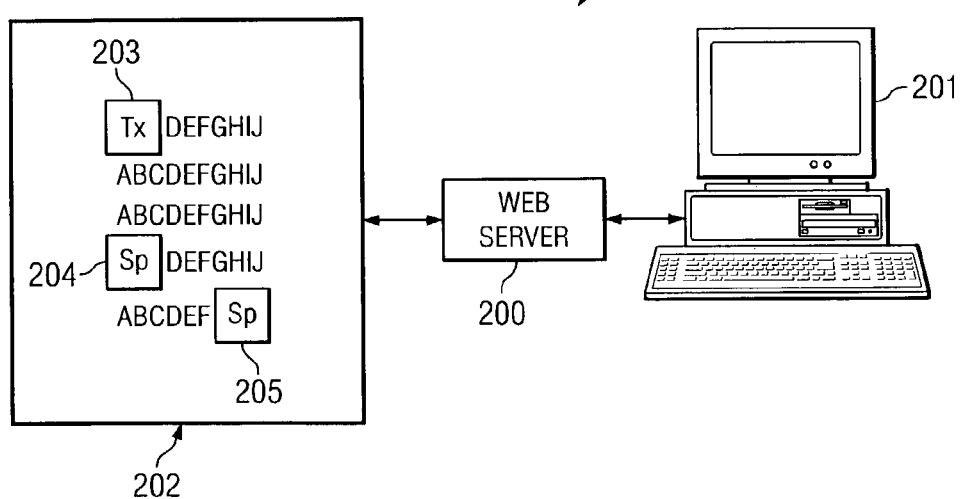
FIG. 2 is a block diagram illustrating an existing proprietary converged voice-Web system.
Figure 3:
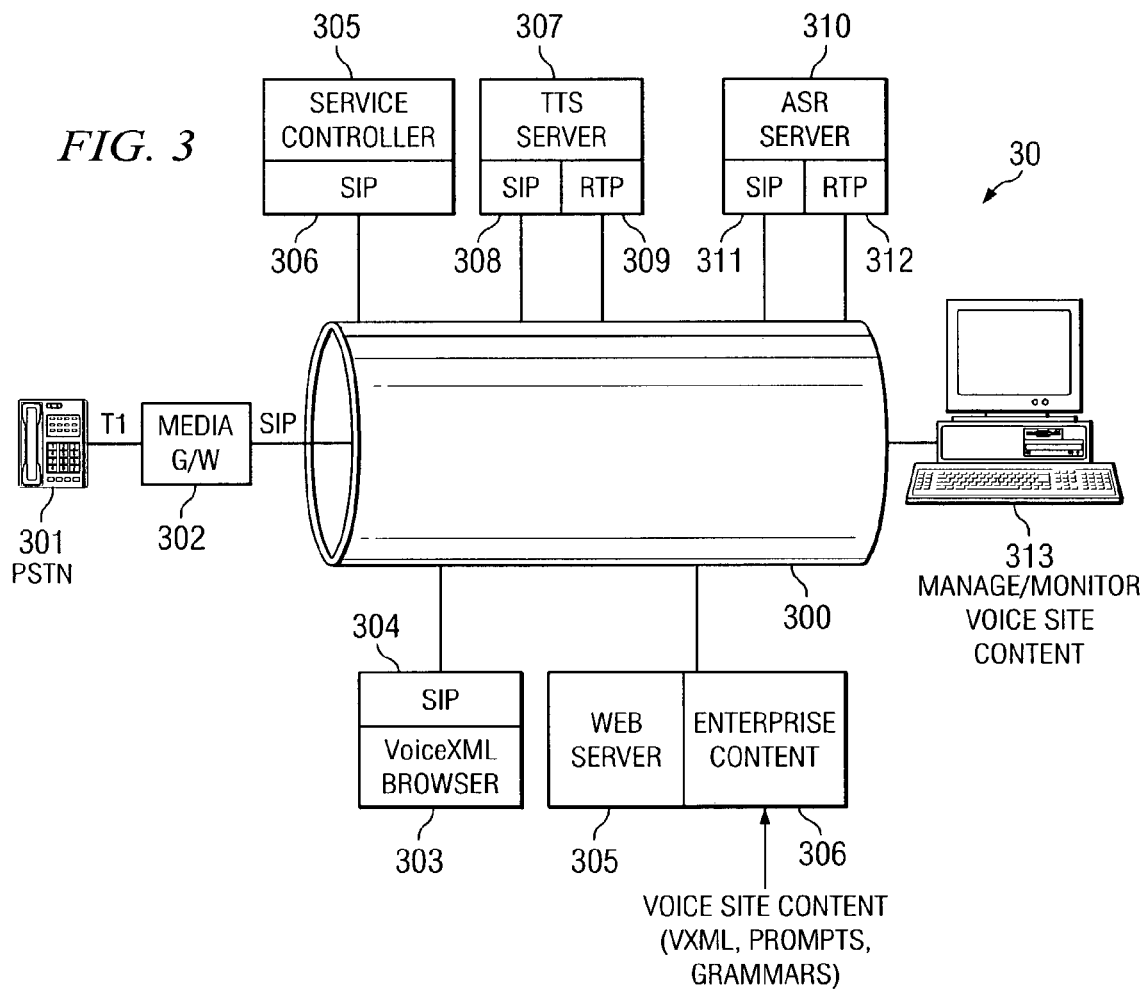
FIG. 3 is a block diagram illustrating a SIP-based local component server system.
Figure 4:
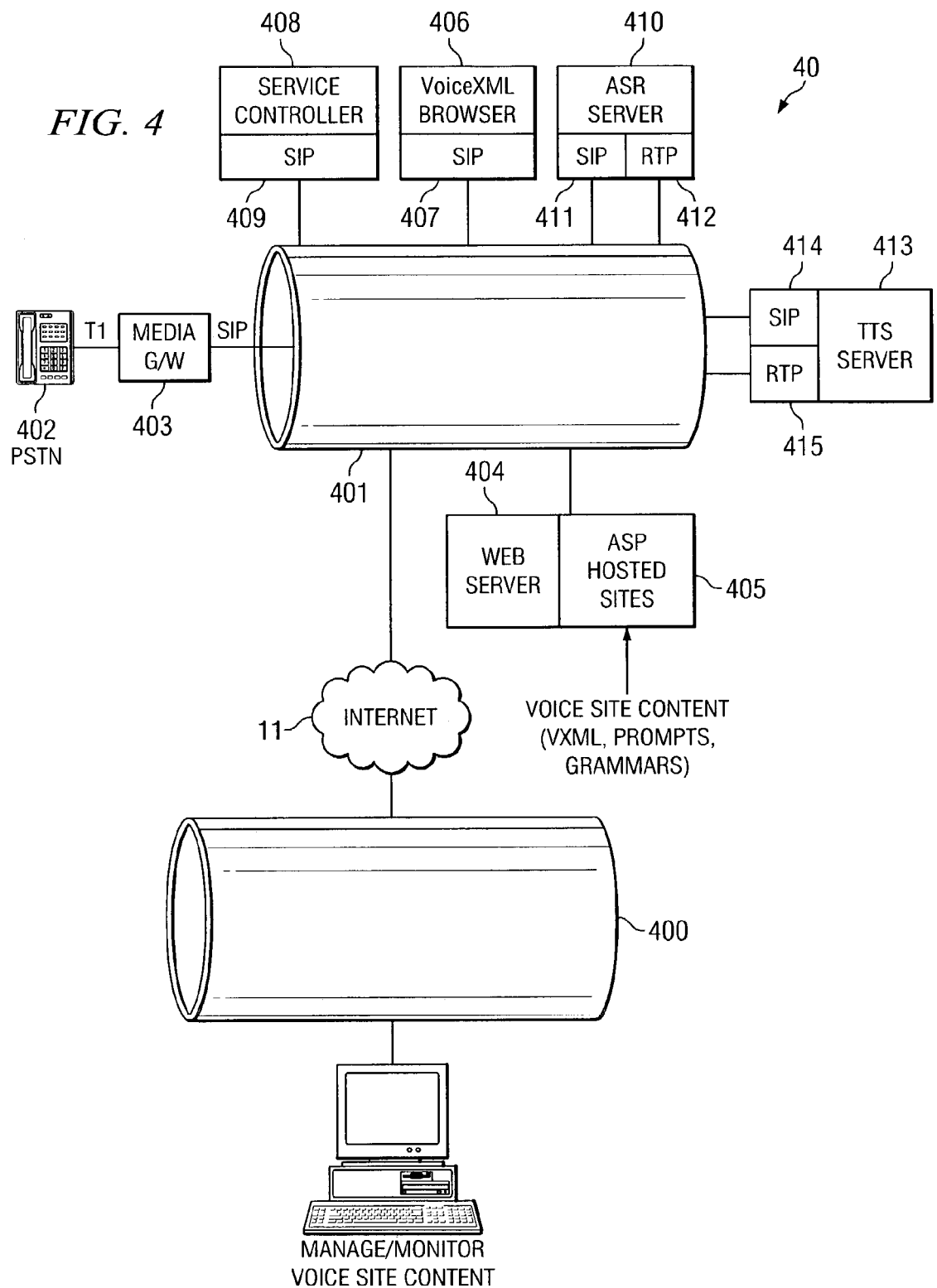
FIG. 4 is a block diagram illustrating a SIP-based distributed component server system.

With the increase in the various e-commerce initiatives, the need to integrate each system together for harmonious operation has also increased. Failure to have each system be, at least, partially integrated with another detracts from the partner/customer/employee experience, which, in turn, likely causes a decrease in use and resulting diminishment of any return on investment. Integration may take the form of interconnecting the operation of many different systems, or may also take the form of centralizing a processing core with many different functionality nodes for operation. Web services have been introduced and used for integrating and sharing functionality in both such ways.

A Web service is a very general model of building applications and can be implemented for any operations system that supports communication over the Internet. Because of their accessibility, Web services may be created as stand-alone services accessed by client applications to perform a specific task or set of tasks, or may also be created as wrappers to incompatible legacy systems exposing the legacy functionality in a more universal manner. Thus, Web services offer a powerful means for integrating various functionality. This ability may be leveraged into the integration of voice and Web applications as well.

One of the many advantages of Web services is a decrease in round trips to and from processing entities. In a typical non-Web service operation, a client requests a page from a server, the server sends the page to the client, the user inputs the data into the page and sends it back to the server, the server processes the data and returns the response/results to the client. This typical interaction constitutes two round trips between the client and the server. In contrast, when a Web service is used, the page loads onto the client with all the components and necessary features already assembled. After the user inputs the data and sends it to the server, everything is executed on the server with the response/results returned to the client. This Web service interaction generally requires only one round trip instead of two. Thus, the Web service implementation is more efficient in this instance.

The platform-independence of Web services is due, in part, to the use of standard access and communication protocols to communicate between each entity. One such protocol is simple object access protocol (SOAP). SOAP is an XML-based access protocol. It typically uses XML syntax to send text commands across the Internet using hypertext transfer protocol (HTTP). Its use of XML over HTTP facilitates its platform independence. Other standard access protocols similar to SOAP include distributed communication object model (DCOM), common object request broker architecture (CORBA), and the like. However, because of its lighter weight, SOAP has generally been preferred and is becoming the standard Web services access protocol.

In typical operation, SOAP wraps the communication that occurs between a service-client and the requested Web service in specifically formatted XML. Thus, a client will typically need an XML parser that can parse the XML returned by the Web service. Additionally, because the client's communication with a prospective Web service or Web service registry will be configured with SOAP formatted XML, the client will generally also have a SOAP utility for generating the appropriate SOAP statements for the Web service interaction. The SOAP utility will usually generate a SOAP envelop, the body of which will contain the communicated data back and forth between the client and the Web service. An additional consideration in the implementation of Web services is that the response returning from the Web services typically do not come back to the client on the same port. Therefore, the client generally also includes a response handler for collecting each response and assembling them into the same page.

Speech applications add another consideration to the process. Because of the asynchronous nature of a call flow, the speech application typically needs to keep track of where a caller is in the call flow. Speech applications typically include jump statements, such as "help," in which the caller may be directed from the middle of one speech component into a completely different speech component. Therefore, a static state machine will generally be implemented on the server to keep track of such asynchronous events. While the systems provided by SANDCHERRY, INC., have been suggested for implementation using Web services, these systems follow the component server architecture by providing specific speech-related functionality as Web service building blocks for the underlying application to access and use. The SANDCHERRY, INC., system still requires the application to be programmed or coded to incorporate VXML or SALT functionality.

Figure 5:
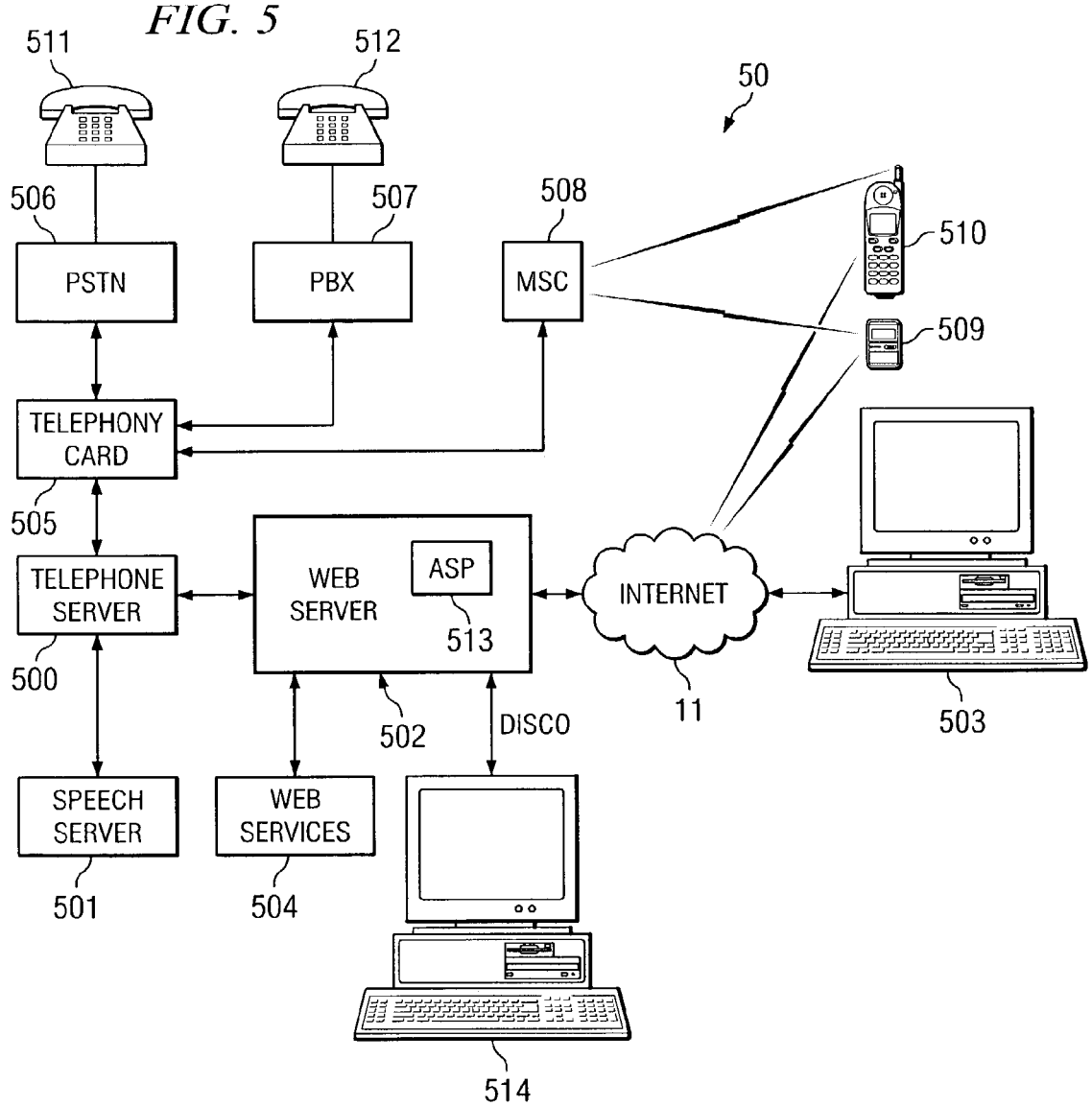
FIG. 5 is a block diagram illustrating converged voice-Web system 30 using one embodiment of Web service speech component.

FIG. 5 is a block diagram illustrating converged voice-Web system 50 using one embodiment of Web service speech component 504. When accessing system 50 through the telephony environment, a call typically comes in through PSTN 506, PBX 507, or MSC 508 from telephony clients 509-512. The call is received on telephony interface manager, (TIM) 500 through telephony interface card (TIC) 505. TIM 500 generally includes multiple instances of a SALT browser either located on TIM 500 or closely associated speech application server (SAS) 501. When the call is presented at TIM 500, TIM 500 retrieves and executes application page 513 located on Web server 502. Application page 513 may be a processing application or a routing application which may use dialed number identification signals (DNIS) or automatic number identification (ANI) to change or launch another application.

Application page 513, in this instance, may be a Web page coded with MICROSOFT CORPORATION's ACTIVE SERVER PAGES™ (ASP) or ASPX™, MACROMEDIA, INC.'S COLDFUSION™ MARKUP LANGUAGE (CFML™), SUN MICROSYSTEM'S JAVASERVER PAGES™ (JSP), or the like. Application page 513 includes a link to Web service speech component 504. Therefore, when TIM 500 requests application page 513, application page 513 calls Web service speech component 504. Web service speech component 504 generates the speech and audible code and tags, such as SALT, VXML, or the like, used for the complete call flow for application page 513 that are ready to be played to any of clients 509-512 accessing through TIC 505.

In a multimodal environment, client 503 requests application page 513 on Web server 502 over Internet 11. When the page-load request comes into Web server 502, Web server 502 calls Web service speech component 504 to provide its service to application page 513. The service provided by Web service speech component 504 imbeds speech components and speech tags, such as SALT, VXML, or the like, into application page 513. Therefore, as Web server 502 processes application page 513 with the newly embedded speech components from Web service speech component 504, the call flow is created in Web server 502 including all jumps, retries, prompts, and responses. The integrated voice-Web page is then sent to client 503 over Internet 11. Client 503 may then implement the call flow. This interaction of the inventive embodiment results in a single round trip between client 503 and server 502.

Utilizing the embodiment of Web service speech component 504, as shown in FIG. 5, Web application developers, such as developer 514 do not need to be familiar with SALT, VXML, or any other speech interface languages. Developer 514 only needs to discover which Web service speech components are subscribed to on Web server 502 and then include a request for the desired one. In the example shown in FIG. 5, system 50 employs MICROSOFT™ server and voice products, thus, a "DISCO" command is issued to Web server 502 to discover the available Web services. Therefore, employing embodiments of the present invention preferably allows ordinary Web developers to incorporate speech/voice interface capabilities without being SALT, VXML, or other speech interface language programmers. Developer 514 may simply plug and play the desired Web service speech component and the speech functionality may be played on compatible SALT, VXML, or the like browsers.

Furthermore, because the logic that implements Web service speech component 504 is presented in a Web service, it is insulated from any of clients 503, 509-512. For example, if a user at client 503 uses a "show source" command, client 503 only sees the source for application page 513 and not for Web service speech component 504. The user only sees that a Web service is called by application 513. Therefore, the implementation and configuration of the Web service is kept secret.

In the implementation of Web service speech component 504 shown in FIG. 5, an entire call flow is addressed. Thus, should developer 514 desire to code a function for obtaining the users social security number, developer 514 merely places a Web service request for a Web service speech component that prompts for a social security number, e.g., Web service speech component 504. Thus, instead of piecing together many different generic sub-tasks, such as prompting for a number, checking for a certain number of numbers, and similar tasks that would be necessary for obtaining a social security number, Web service speech component 504 addresses the entire call flow including error handling and input verification.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multimodal application system comprising:
   an application server page located on a Web server, said Web server accessible by a telephone client through a telephone server;
   a speech-enabled Web service defining a call flow for completing a desired speech task;
   a speech tag generator within said Web service for generating speech tags representing said call flow in a result of said Web service; and
   a speech tag-compatible client-side runtime for displaying said result to said client application.

2. The multimodal application system of claim 1 further comprising:
   a Web service locator incorporated into said application server page for addressing a request for said speech-enabled Web service.

3. The multimodal application system of claim 1 wherein said client application resides on one or more of:
   said telephone server; and
   a computer client.

4. The multimodal application system of claim 1 further comprising:
   a telephony interface for facilitating communication between said telephone client and said telephone server.

5. The multimodal application system of claim 4 wherein said telephone client accesses said telephony interface using one of:
   a public switched telephone network (PSTN);
   a private branch exchange (PBX); and
   a mobile switching center (MSC).

6. The multimodal application system of claim 1 further comprising:
   a speech server in communication with said telephone server for executing said speech tag-compatible client-side runtime.

7. The multimodal application system of claim 2 wherein a developer requests to discover said Web service locator from said Web server.

8. The multimodal application system of claim 1 further comprising:
   a dual use client, wherein said dual use client accesses said Web service through one of:
   said telephone server; and
   a data network.

9. The multimodal application system of claim 8 wherein said data network comprises an Internet.

10. The multimodal application system of claim 1 further comprising:
    a multimodal client, wherein said multimodal client accesses said Web service through a data network.

11. The multimodal application system of claim 10 wherein said data network comprises an Internet.

12. The multimodal application system of claim 1 wherein said desired speech task comprises each interactive voice step for performing an interactive task.

13. The multimodal application system of claim 1 wherein said speech tags comprise at least one of:
    speech application language tags (SALT); and
    voice extensible markup language (VXML).

14. A method for providing a call flow to a client, wherein said client accesses a Web-based application having no imbedded speech functionality, said method comprising:
    providing call flow logic to a Web service;
    generating speech indicators responsive to said call flow logic;
    requesting said Web service from said Web-based application;
    determining a path to said Web service from service indicators imbedded within said Web-based application;
    executing said Web service responsive to said request;
    returning a result from said executing to said Web-based application, wherein said result includes said speech indicators; and
    presenting said result to said client.

15. The method of claim 14 wherein said client is one or more of:
    a telephony client; and
    a multimodal client.

16. The method of claim 15 further comprising:
    accessing said Web-based application by said telephony client through a telephone server.

17. The method of claim 15 further comprising:
    accessing said telephone server by said telephony client through a telephony interface.

18. The method of claim 15 further comprising:
    accessing said Web-based application by said multimodal client through a data network.

19. The method of claim 18 wherein said data network comprises an Internet.

20. The method of claim 15 wherein said result is processed on a speech server for presentation to said telephony client.

21. The method of claim 15 wherein said result is processed on said multimodal client for presentation.

22. The method of claim 14 wherein said speech indicator comprises at least one of:
    speech application language tags (SALT); and
    voice extensible markup language (VXML).

23. A system for distributing a complete call flow to a client, wherein said client accesses a Web-based application having no voice functionality, said system comprising:
    means for coding call flow logic into a Web service;
    means for generating speech tags responsive to said call flow logic;
    means for initiating said Web service from said Web-based application;
    means for determining a location of said Web service from description language tags imbedded within said Web-based application;
    means for executing said Web service responsive to said means for initiating;
    means for presenting a result from said means for executing to said Web-based application, wherein said result includes said speech tags; and
    means for displaying said result to said client.

24. The system of claim 23 wherein said client is one or more of:
    a telephone client; and
    a computer client.

25. The system of claim 24 further comprising:
    means for accessing said Web-based application by said telephone client through a telephone server.

26. The system of claim 24 further comprising:
    means for accessing said Web-based application by said computer client through an Internet.

27. The system of claim 24 wherein said result is processed on a speech processing server for presentation to said telephone client.

28. The system of claim 27 wherein said speech processing server is affiliated with a telephone server.

29. The system of claim 24 wherein said result is processed on said computer client for presentation.

30. The system of claim 23 wherein said speech tags comprise at least one of:
    speech application language tags (SALT); and
    voice extensible markup language (VXML).

31. A computer program product having a computer readable medium with computer program logic recorded thereon, said computer program product comprising:
    code for defining a call flow in a Web service;
    code for generating speech tags to implement said call flow on a client application;
    code for calling said Web service from an application server page using description tags imbedded within said application server page;
    code for executing said Web service responsive to said code for calling;
    code for returning a result to said application server page, wherein said result includes said speech tags; and
    code for displaying said result to said client application.

32. The computer program product of claim 31 wherein said client application originates from at least one of:
    a telephone client; and
    a computer client.

33. The computer program product of claim 32 further comprising:
    code for communicating with said application server page by said telephone client through a telephony server.

34. The computer program product of claim 32 further comprising:
    code for communicating with said application server page by said computer client through an Internet.

35. The computer program product of claim 32 further comprising:
    code for processing said result on a speech processing server for presentation to said telephone client.

36. The computer program product of claim 35 wherein said speech processing server is affiliated with a telephone server.

37. The computer program product of claim 32 wherein said result is processed on said computer client for presentation.

38. The computer program product of claim 31 wherein said speech tags comprise at least one of:
    speech application language tags (SALT); and
    voice extensible markup language (VXML).

39. The computer program product of claim 31 wherein said call flow comprises:
    code for interacting with a caller to obtain information;
    code for interactively administering said code for interacting responsive to said information; and
    code for interactively assisting said caller in providing said information.

40. A Web service for providing a complete call flow to a client application, said Web service comprising:
    logic for defining said call flow;
    a speech code generator for generating speech enabling indicators representing said call flow, said speech code generator operating responsive to said logic; and
    a client-interface for receiving requests for said Web service and for returning results of executing said logic to said client application.

41. The Web service of claim 40 wherein said complete call flow comprises:
    interactive steps for obtaining information from a caller;
    interactive steps for administering said call flow; and
    interactive steps for assisting said caller in providing said information.

42. The Web service of claim 40 wherein said speech enabling indicators comprise at least one of:
    speech application language tags (SALT); and
    voice extensible markup language (VXML).

43. The Web service of claim 40 wherein said client-interface includes a simple object access protocol (SOAP) interface.

44. The Web service of claim 40 wherein said results include said speech enabling indicators.

* * * * *